(12) United States Patent
Mayhew

(10) Patent No.: US 6,565,426 B2
(45) Date of Patent: May 20, 2003

(54) RELEASE GAMBREL

(76) Inventor: James T. Mayhew, 20130 Bel Aire Dr., Miami, FL (US) 33189

( * ) Notice: Subject to any disclaimer, the term of this patent is extended or adjusted under 35 U.S.C. 154(b) by 0 days.

(21) Appl. No.: 09/804,477

(22) Filed: Mar. 13, 2001

(65) Prior Publication Data

US 2001/0036808 A1 Nov. 1, 2001

Related U.S. Application Data

(60) Provisional application No. 60/189,471, filed on Mar. 15, 2000.

(51) Int. Cl.$^7$ .................................................. A22B 1/00
(52) U.S. Cl. ........................ 452/185; 452/189; 452/191
(58) Field of Search ................................ 452/189, 185, 452/187, 190, 191

(56) References Cited

U.S. PATENT DOCUMENTS

| | | | | |
|---|---|---|---|---|
| 1,159,528 A | * | 11/1915 | Noonan | 452/191 |
| 1,172,489 A | * | 2/1916 | Schellinger | 452/189 |
| 1,311,361 A | * | 7/1919 | Vickers | 452/191 |
| 1,345,112 A | * | 6/1920 | Andrew | 452/189 |
| 1,413,780 A | * | 4/1922 | Rauch | 452/191 |
| 2,169,928 A | * | 8/1939 | Saley | 452/189 |
| 2,227,698 A | * | 1/1941 | Braun | 452/189 |
| 5,304,091 A | * | 4/1994 | Wilkinson | 452/189 |

* cited by examiner

Primary Examiner—Peter M. Poon
Assistant Examiner—Joan M. Olszewski
(74) Attorney, Agent, or Firm—Venable LLP; John P. Shannon; Chad C. Anderson

(57) ABSTRACT

A support apparatus for an animal has a frame for suspending an animal for hanging, gutting, cleaning and/or storage. At least one prong member is connected to the frame and has at least one hook extending from it. The prong member is movable between an animal supporting position and an animal releasing position. A securing mechanism releasably secures the prong member in the animal supporting position until the hanging, gutting, cleaning and/or storage and any additional processing is completed, after which the prong member is free to fall to the release position and the animal is released from the support.

20 Claims, 13 Drawing Sheets

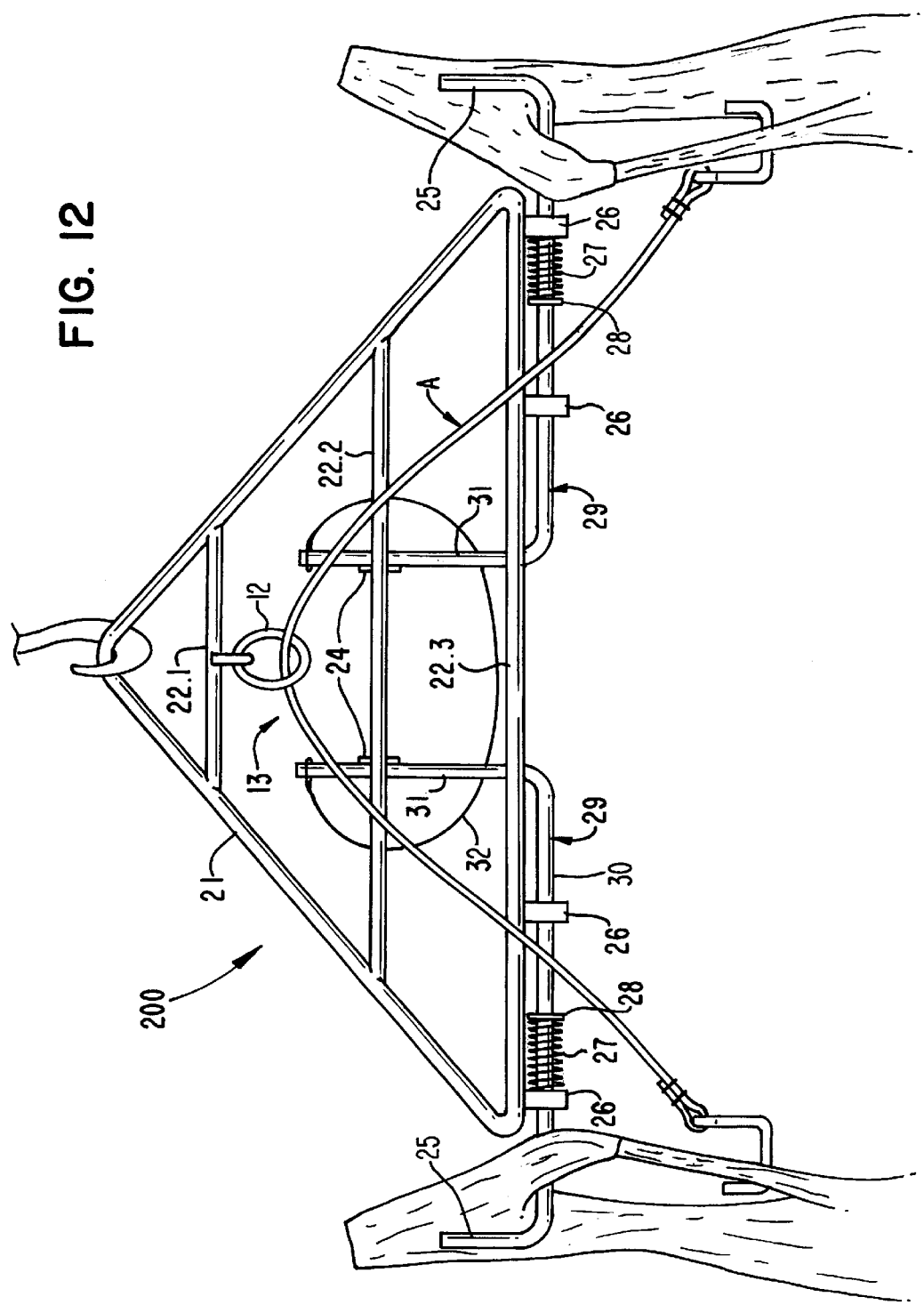

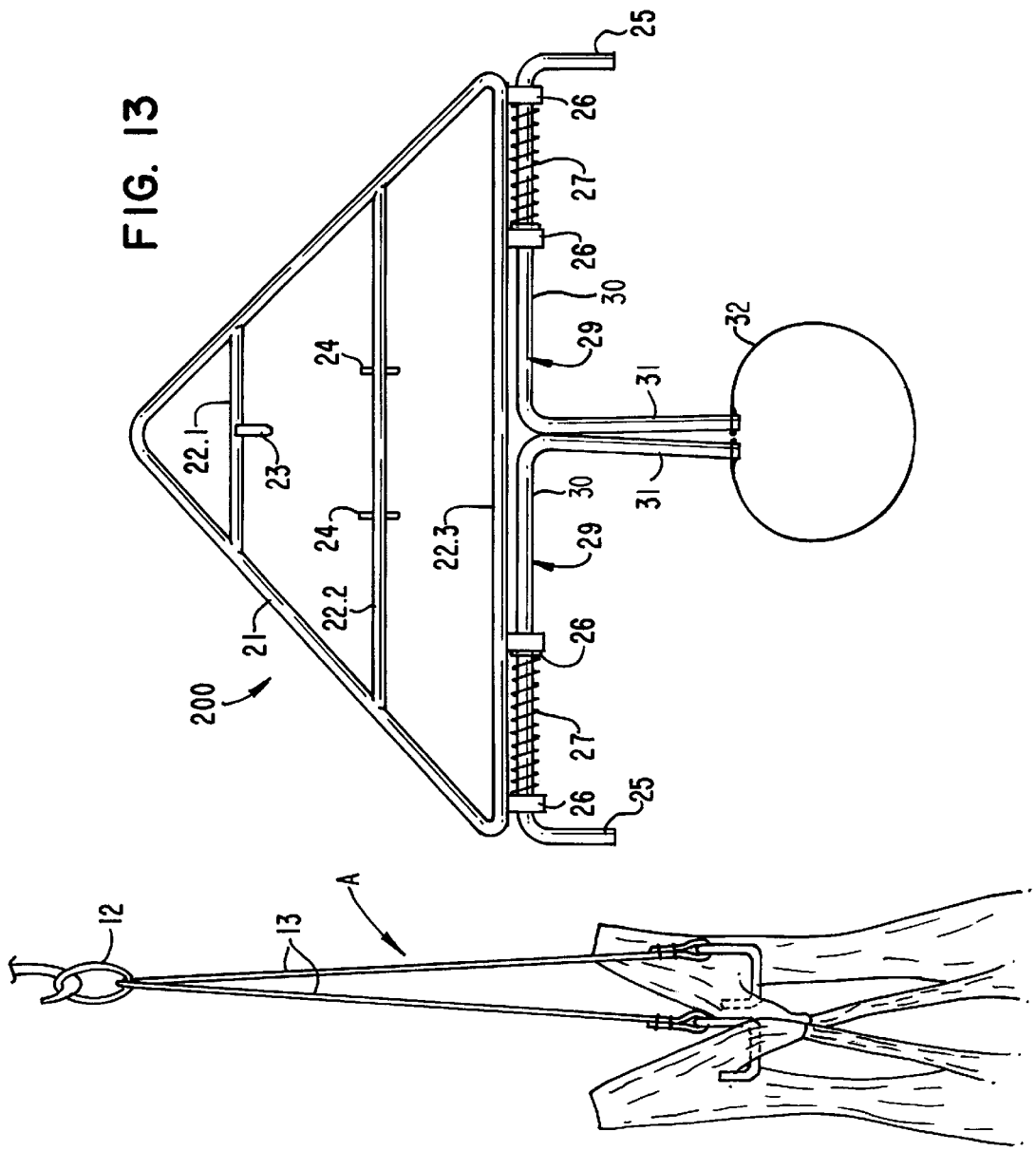

US 6,565,426 B2

RELEASE GAMBREL this application claims the benefit of Provisional application No. 60/189,471, filed Mar. 15, 2000.

BACKGROUND OF THE INVENTION

The present invention relates to a releasable support apparatus for an animal and, more particularly, to an apparatus for suspending an animal for hanging, gutting, dressing out, handling and storage, with a quick, safe release of the animal during, or upon completion of, the processing of the animal. The present invention also contemplates an optional auxiliary support assembly for supporting the animal during the release and after the release, and for providing for further handling, processing or storage of the animal.

SUMMARY OF THE INVENTION

By the present invention, an apparatus is provided by which wild and domestic animals such as deer, pigs, cows, sheep, and the like can be attached by the hind legs for hanging, gutting, dressing out, handling and storage, with a quick, safe release upon completion of the processing and/or storage of the animal. The apparatus consists of a frame with attached prongs for receiving the legs between the bone and tendon, the prongs being movable between an animal-supporting position, in which the animal can be gutted, dressed out, handled or stored, and a releasing position, in which the animal can be removed or supported by an auxiliary support assembly.

The auxiliary support assembly includes a ring and a line or cable assembly attachable to the legs of the animal and to the support apparatus. Additionally, a securing mechanism is provided to hold the prongs in the animal-supporting position and thereby safely retain the animal during processing. The securing mechanism can be activated to permit the prongs to move under the influence of gravity to their release position, whereupon the legs fall from the prongs. Where the auxiliary support apparatus is used, after its release from the prongs, the animal is still supported by the ring and the line or cable, which are attached to the support apparatus. The auxiliary support assembly can be removed from the support apparatus with the animal and thereby provide a mechanism by which the animal can be hung for further processing or cold storage. Alternatively, the releasable support apparatus can be kept in the animal animal-supporting position and used to store the animal.

BRIEF DESCRIPTION OF THE DRAWINGS

FIG. 12 is a perspective view of the of the embodiment of FIG. 11, showing animal legs attached to the support apparatus and the auxiliary support assembly attached to the apparatus and the animal legs; and FIG. 13 is a perspective view showing the auxiliary support assembly and the animal legs removed from the support apparatus of FIG. 12.

DETAILED DESCRIPTION OF THE PREFERRED EMBODIMENTS

Figure 1:
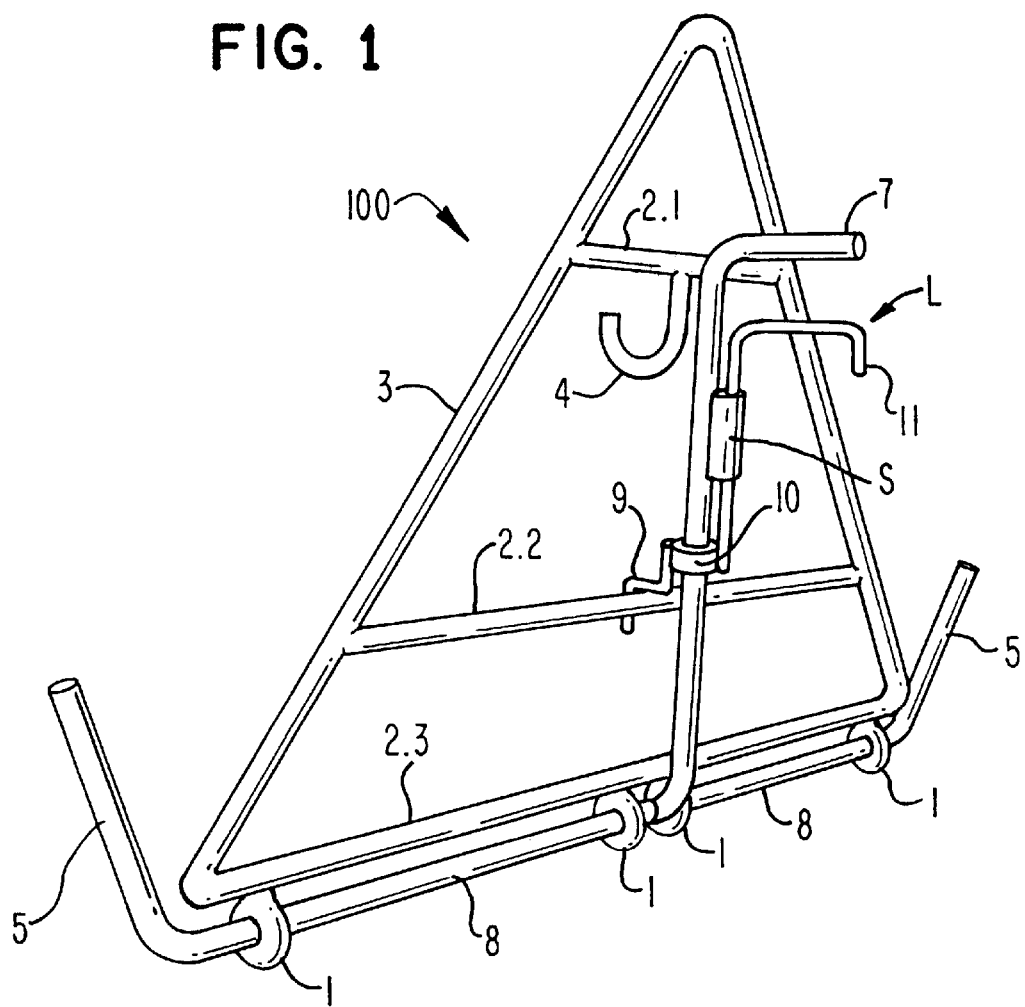
FIG. 1 is a perspective view of a first embodiment of the support apparatus of present invention in an animal-supporting position.

As can be seen from FIGS. 1–10, a preferred embodiment of the support apparatus according to the present invention, which is designated generally by the reference numeral 100, includes a frame 3 constructed of a strong material, such as steel, having a plurality of spaced horizontal members 2.1, 2.2, and 2.3. In the illustrated embodiment, the frame is triangular, with a point of the triangle at the top, making the frame 3 well suited for hoisting by a cable and pulley. A pivot member 8 has a prong 5 at each laterally outward end, the prongs extending upward in an animal-supporting position of the apparatus 100 and downward in an animal release position. Pivot member 8 is received in eyes 1 secured to the bottom horizontal member 2.3, the pivot member 8 being mounted for pivoting in the eyes 1. A pivot arm 7 extends generally perpendicular from the middle of the pivot member 8. Preferably, there are four eyes 1—one eye near each end of the lower horizontal member 2.3 and two eyes near the center, on and spaced from one another, the latter two eyes being opposite sides of the pivot arm 7, as is shown in FIG. 1.

Figure 2:
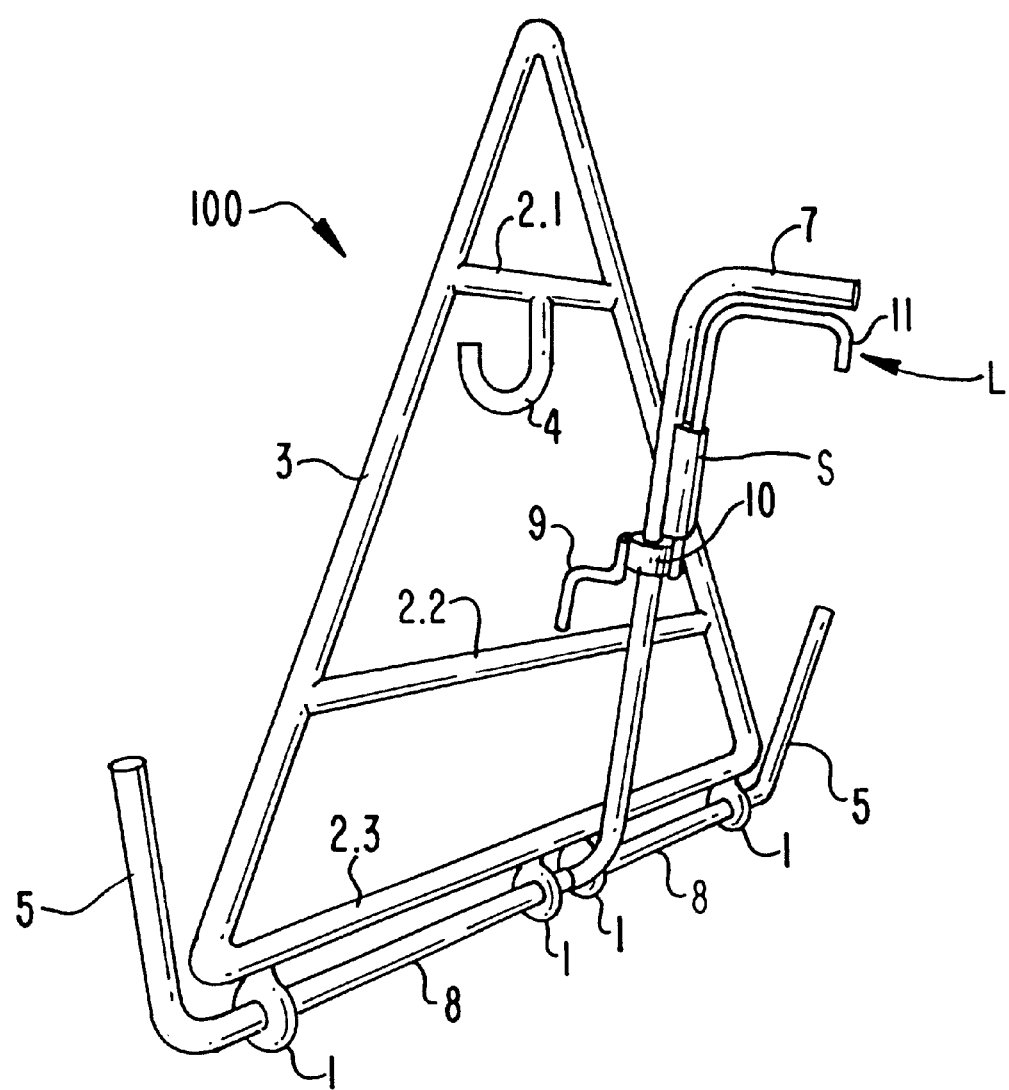
FIG. 2 is a perspective view of the support apparatus of FIG. 1 with a locking mechanism in a release position.
Figure 3:
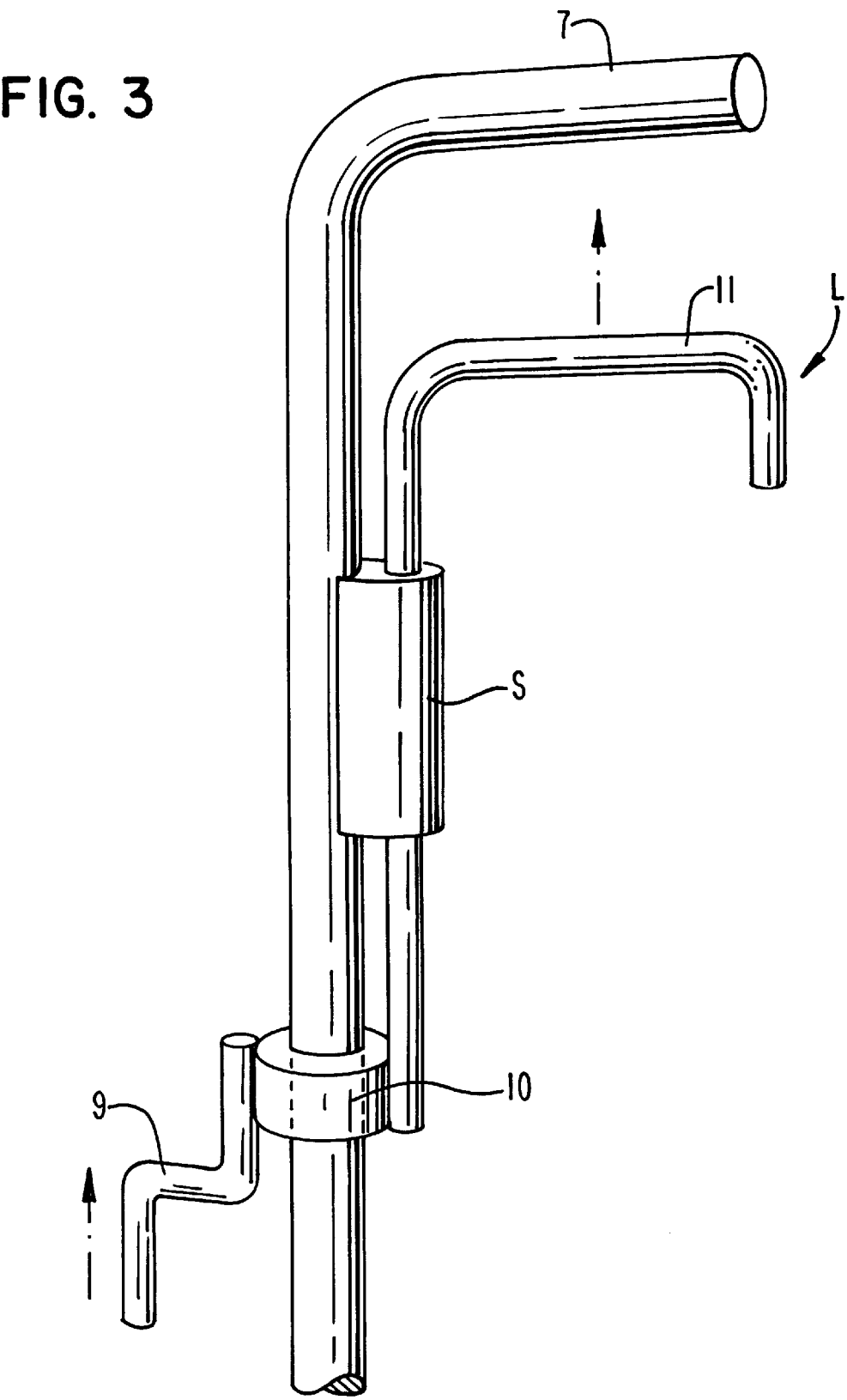
FIG. 3 is an enlarged perspective view of the locking mechanism of the support apparatus of FIGS. 1 and 2.
Figure 4:
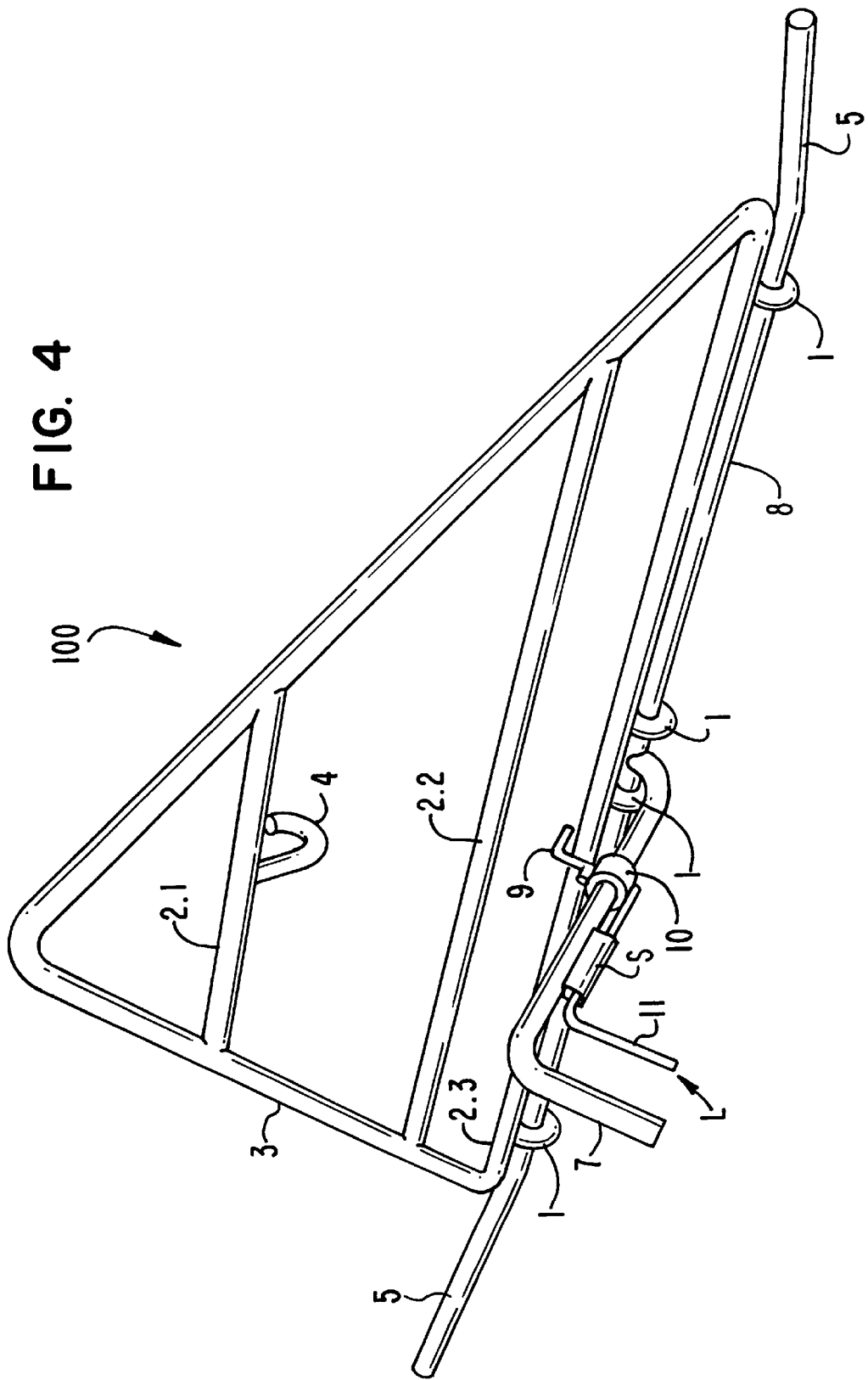
FIG. 4 is a perspective view of the support apparatus of FIG. 1 between the animal-supporting position and a release position.
Figure 5:
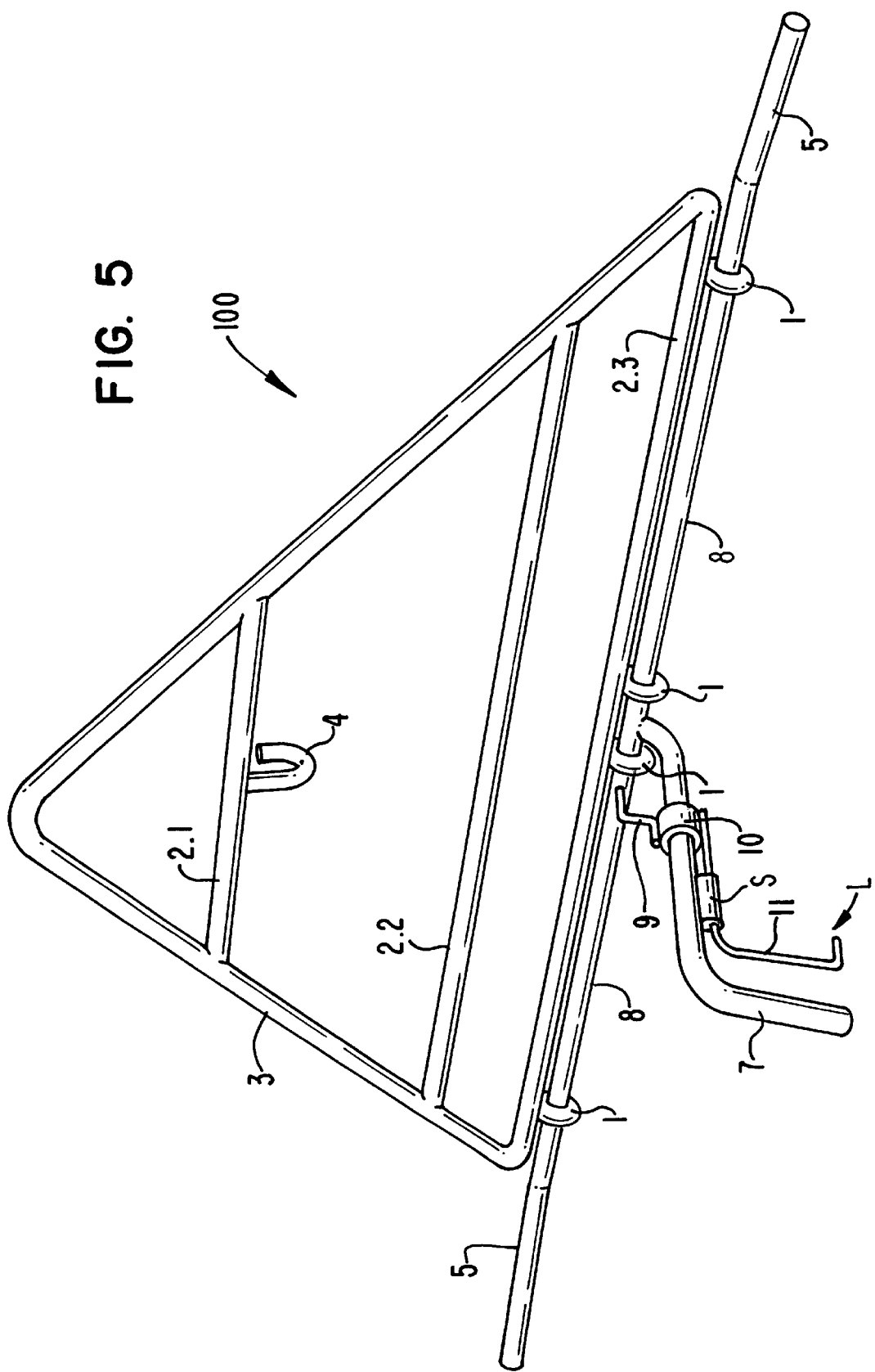
FIG. 5 is perspective view of the apparatus of FIG. 1 closer to the release position than the support apparatus of FIG. 4.
Figure 6:
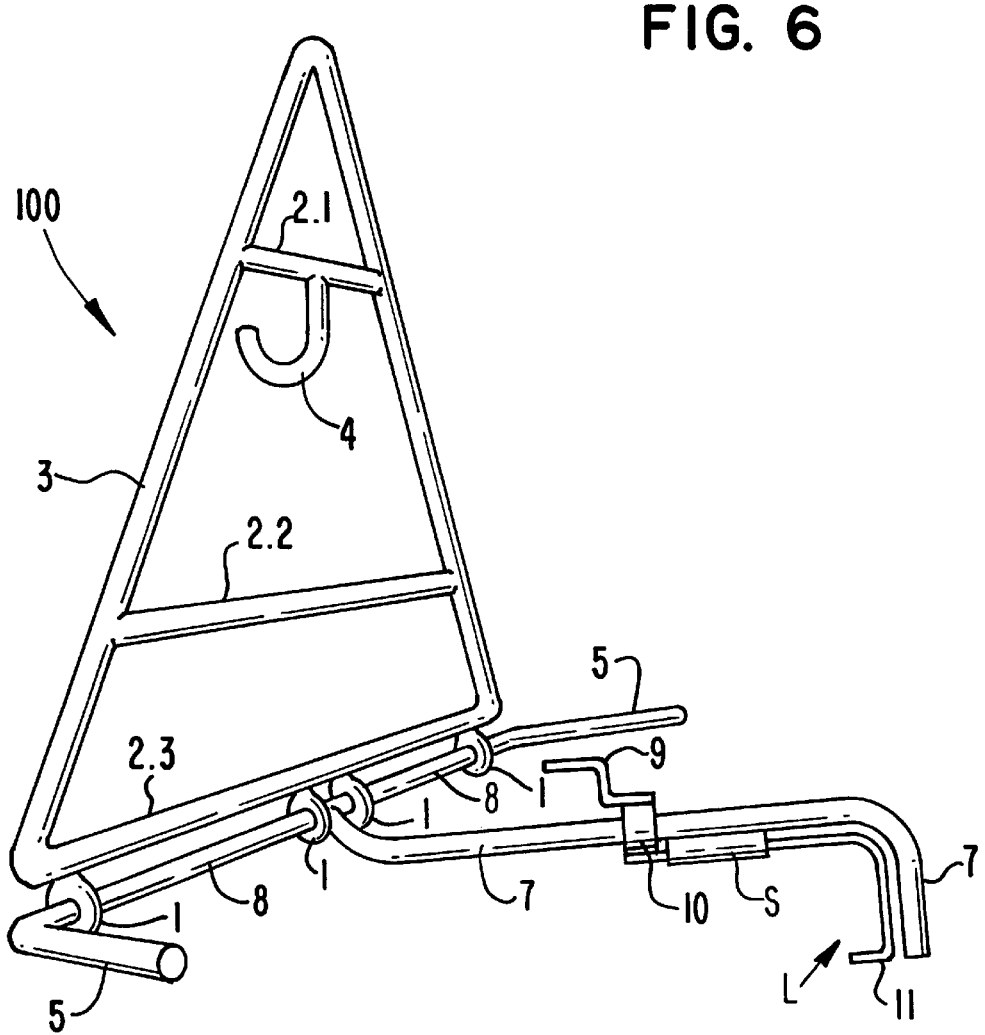
FIG. 6 is perspective view from a different perspective of the apparatus of FIG. 1 close to the release position.
Figure 7:
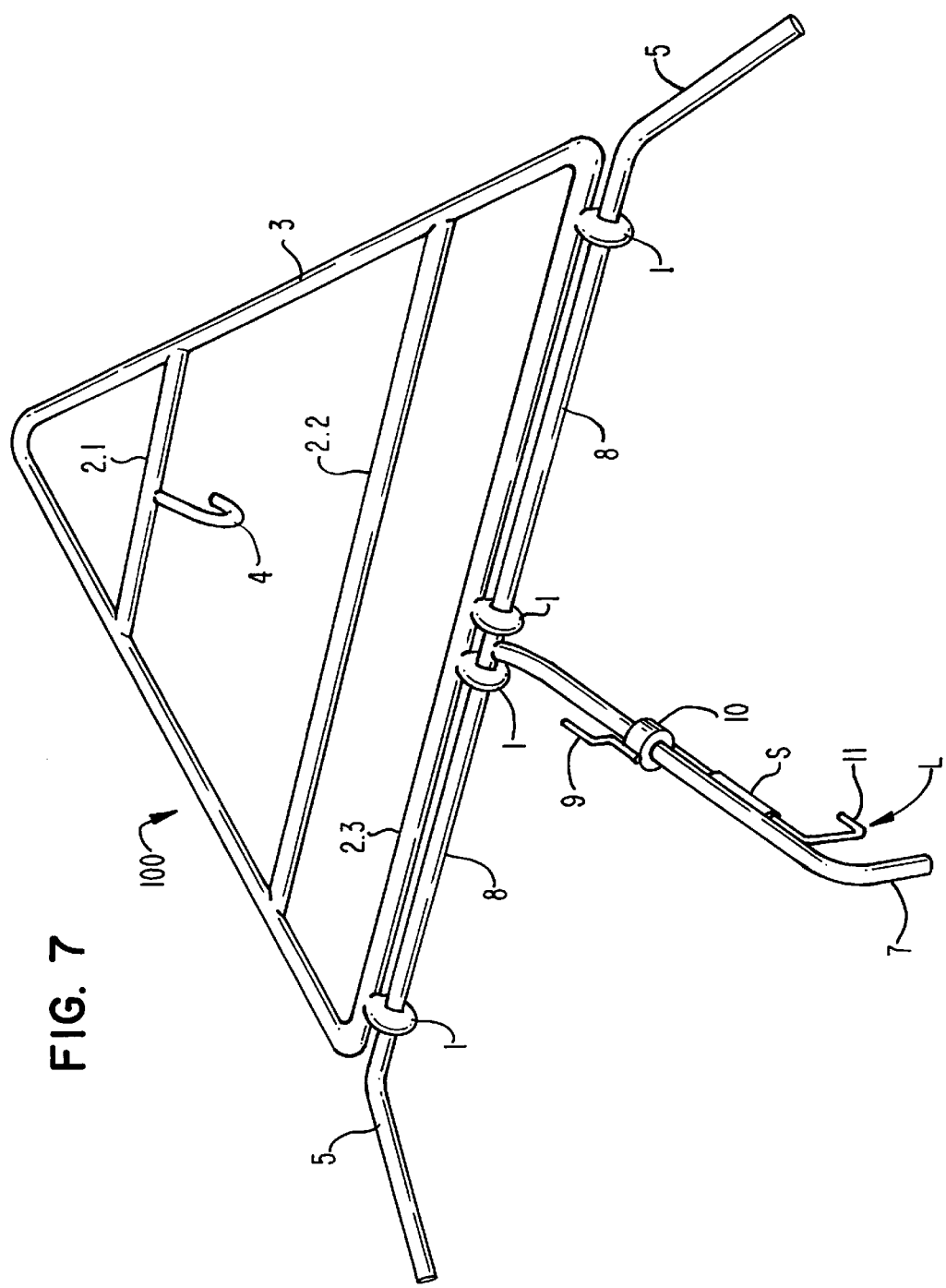
FIG. 7 is a perspective view of the apparatus of FIG. 1 in the full release position.

As can be seen particularly from FIGS. 1 and 2, the pivot arm 7 has a locking mechanism L to retain the prongs 5 in an upwardly extending, animal supporting position. In this embodiment, the details of which are shown in FIG. 3, the locking mechanism L is has a safety hook 9 projecting from a sliding sleeve 10 that engages the middle horizontal member 2.2 of the frame 3. The sliding sleeve 10 has a release trigger 11, which is lifted in an upward direction to release the pivot arm 7, as can be seen in FIG. 2. The sliding sleeve 10 is prevented from rotating about pivot arm 7 by sliding reception of the release trigger 11 in a stop member S fixed to the pivot arm. The safety hook 9 engages the middle horizontal member 2.2 and thereby locks the prongs 5 in their upward and outward animal supporting position until the release trigger 11 and the hook 9 are raised, whereby the pivot member 8 is free to pivot downward, allowing the legs of the animal to slide off of the prongs 5 under the influence of gravity. Alternative designs for the locking mechanism L may be used, varying for instance the point of releasable engagement, the release mechanism, etc. without departing from the spirit of the invention.

Figure 8:
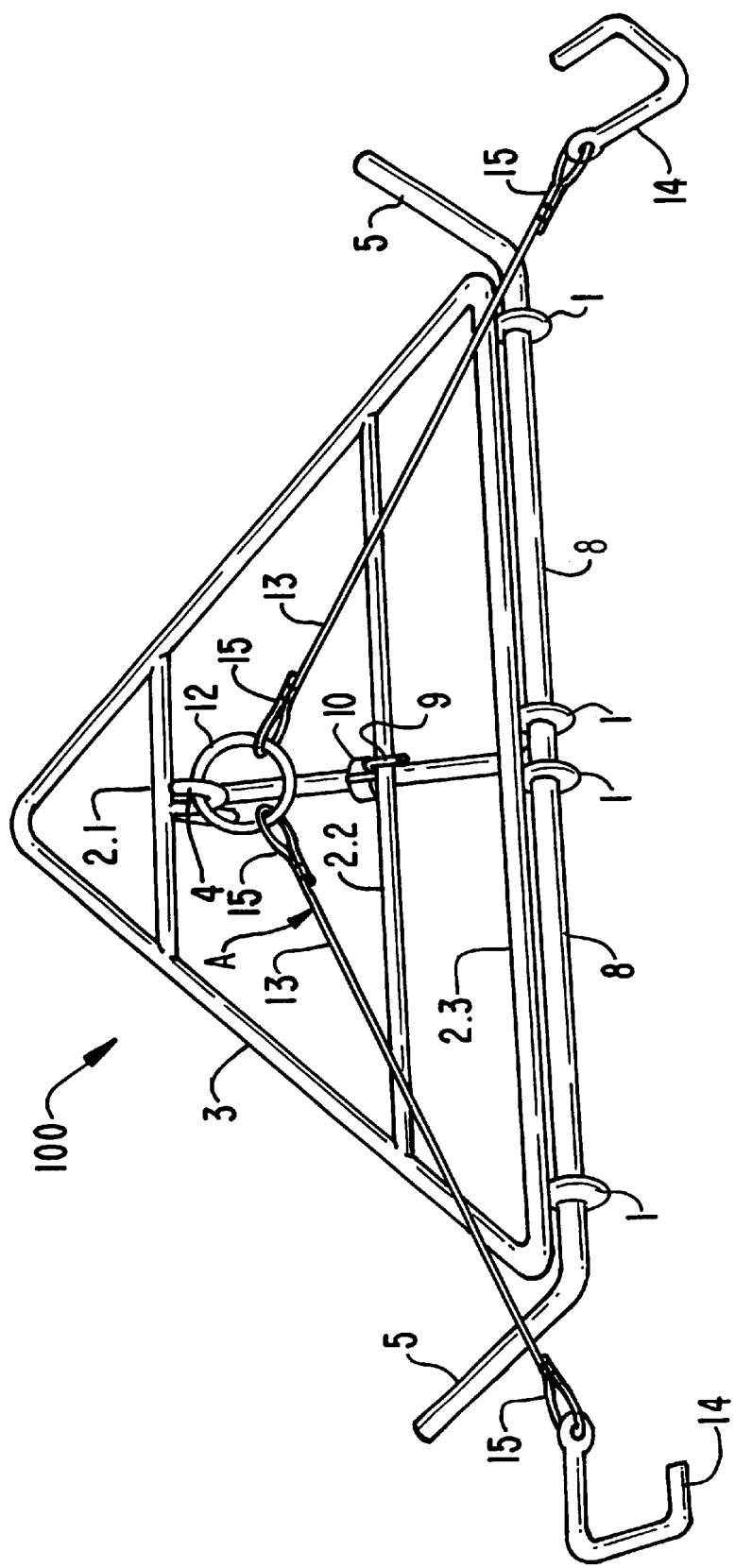
FIG. 8 is a perspective view of the apparatus of FIG. 1 with an auxiliary support assembly attached an in a back-ups supporting position.
Figure 9:
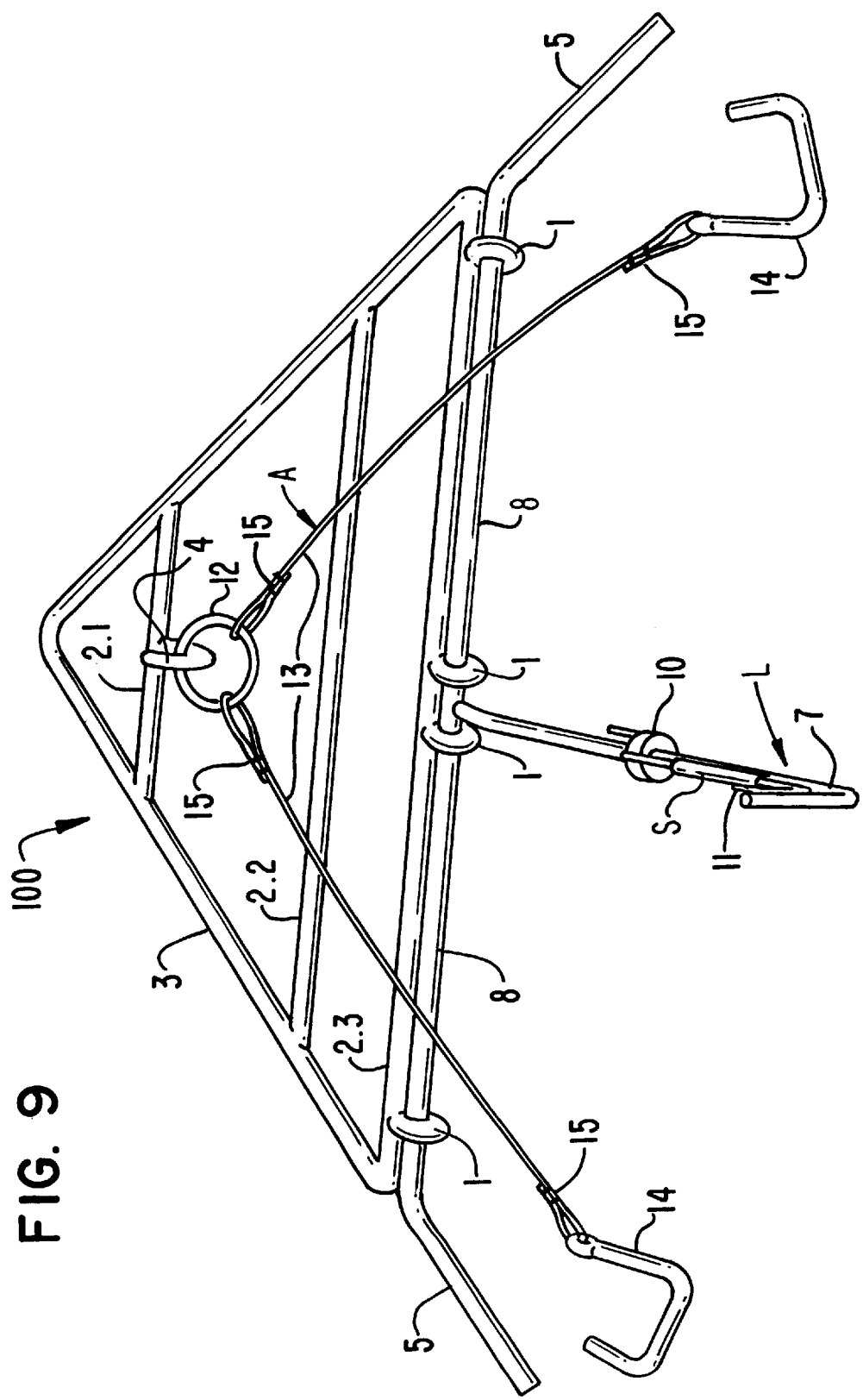
FIG. 9 is a further perspective view of the support apparatus of FIG. 1 in the full release position, with the auxiliary support assembly attached and in a back-ups supporting position.
Figure 10:
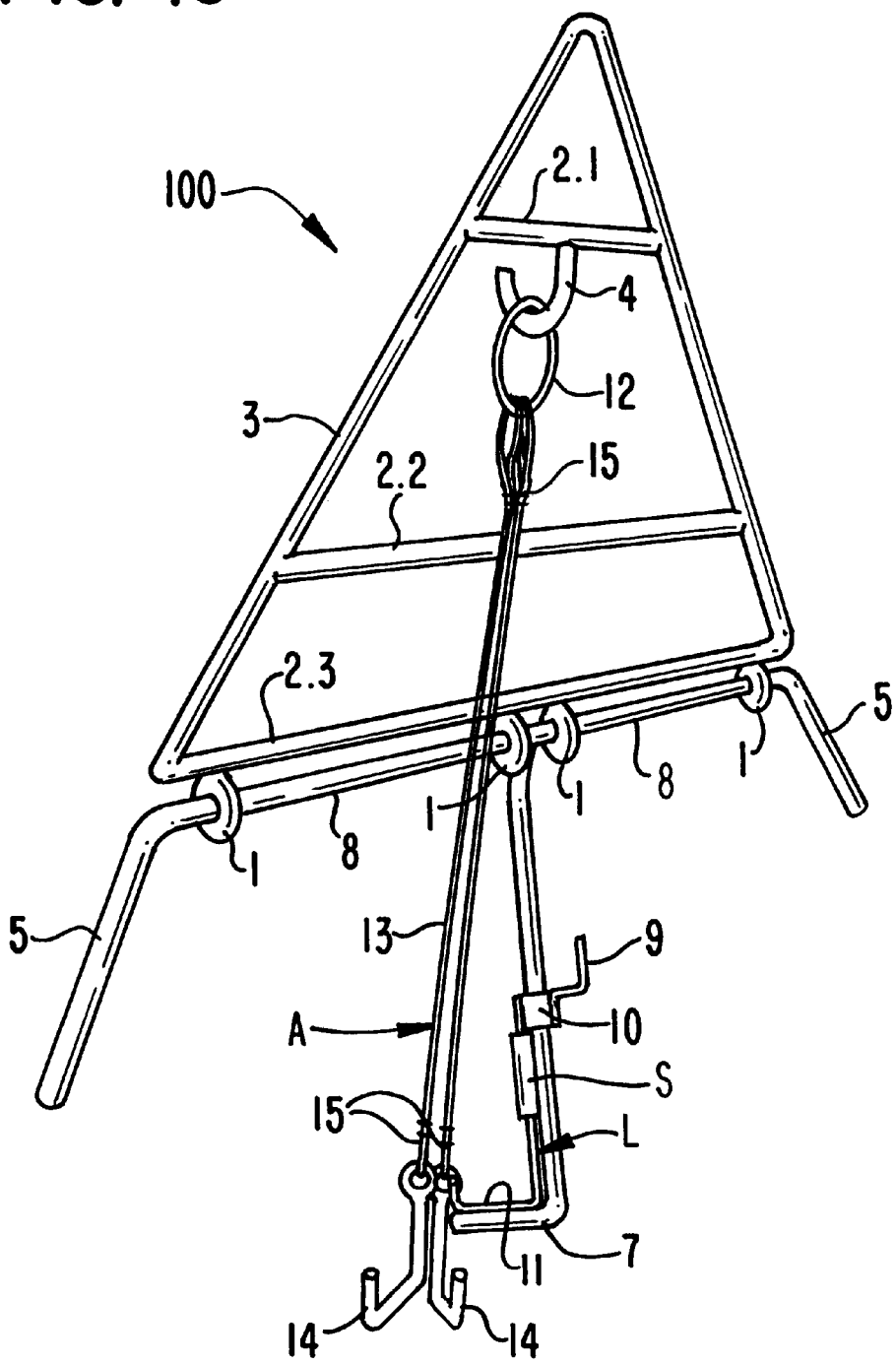
FIG. 10 is another perspective view of the support apparatus of FIG. 1 in the release position and the auxiliary support in a supporting position.

As can be appreciated from FIGS. 8 and 9, an auxiliary support assembly A is secured to the legs of the animal in the manner shown in FIGS. 12 and 13 and attached to an upwardly opening hook 4 fixed on the top horizontal member 2.1, so that the auxiliary support assembly supports the animal by the legs when the legs have been released from the prongs 5. The auxiliary support assembly A includes a ring 12, two lines or cables 13, and a hook or retainer 14 at one end of each line or cable 13. The hooks or retainers 14 may take the form of spring-loaded clips, hooks as illustrated, or any suitable fastener. The ends of the lines or cables 13 not attached to the hooks or retainers 14 are attached to the ring 12, which is attachable to the hook 4 secured to the frame 3, preferably at the midpoint of the upper horizontal member 2.1. The hook 4 is preferably secured at this or another point or a point similarly disposed directly below the point from which the frame 100 is suspended, which is the top of the triangle. Such an securement point for the hook 4 minimizes the pitch and yaw of the frame upon release. The hooks or retainers 14 are attached to either the bone or tendon of each leg of the animal or received between the bone and the tendon (FIGS. 12 and 13). The prongs 5 project upwardly to prevent the legs of the animal from slipping off the prongs 5. Once the legs are released from the prongs 5, by lifting the safety trigger 11, moving the pivot arm 7 downward, and rotating the pivot member 8, the animal is retained on the frame 3 by the auxiliary support assembly A on the hook 4 in the manner shown in FIG. 13, with the cables 13 and hooks 14 in the position shown in FIG. 10. The ring 12 of the auxiliary supporting assembly A can be removed from the hook 4 when removal of the animal is desired. The auxiliary support assembly A permits the animal to be hung for further processing or storage in a large refrigerator, freezer, or like cold storage unit.

Figure 11:
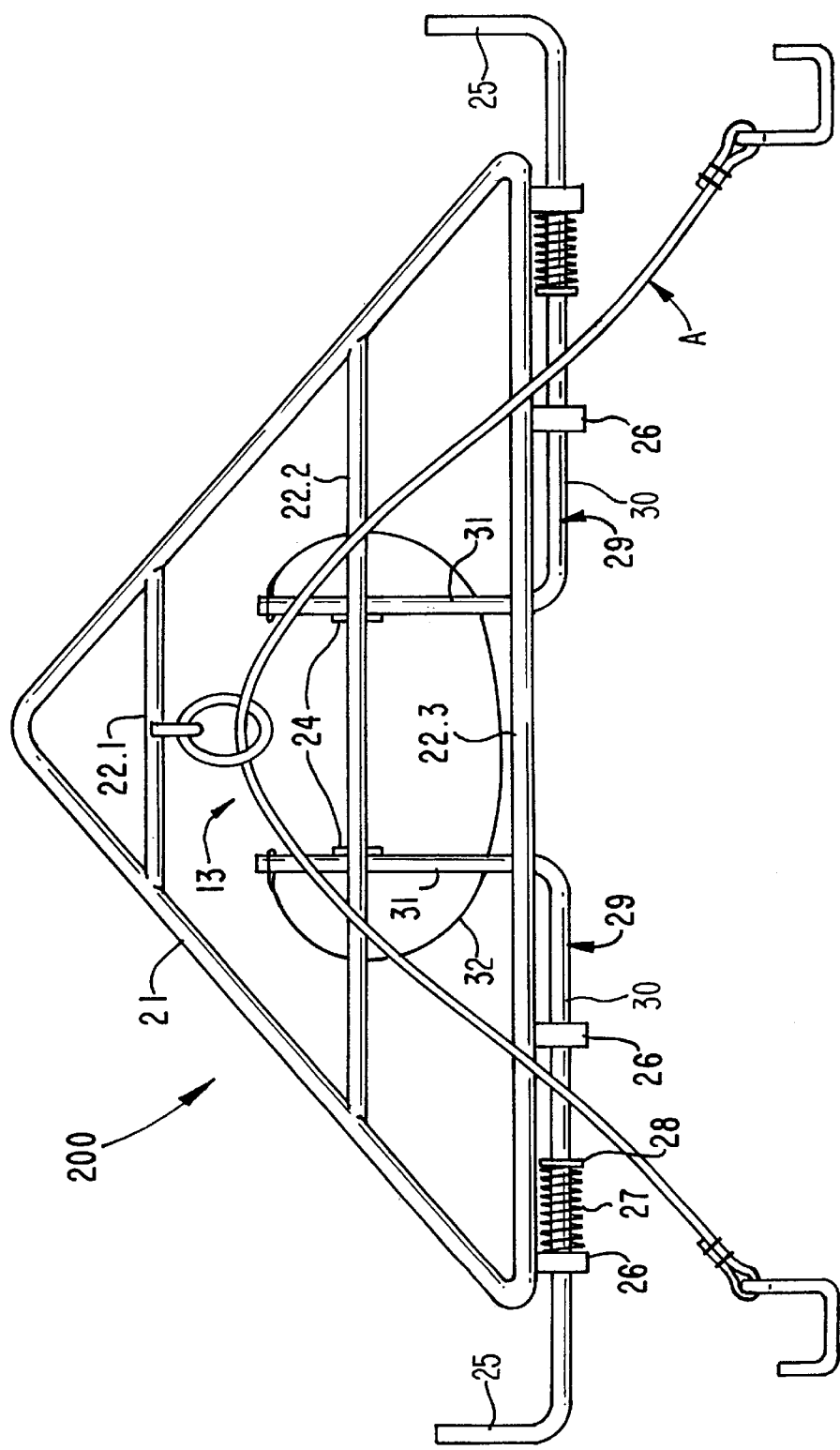
FIG. 11 is a perspective view of an alternative embodiment of the apparatus.

As can be seen from FIGS. 11–13, in an alternative embodiment, the support apparatus, which is designated generally by the reference numeral 200, has a frame 21 essentially the same as the frame 3, but the prongs 25 are provided at laterally outward ends of separate pivot members 29. Each of the pivot members 29 is received in eyes 26 secured preferably to the bottom horizontal member 22.3, the pivot members 29 being pivotable and slideable in the eyes 26. Each pivot member 29 includes a main portion 30 and a pivot arm 31 extending perpendicularly from the main portion 30 at a laterally inner end. Each pivot member 29 is supported by two of the eyes 26, one of which is laterally outside the other, and a compression spring 27 is positioned between the laterally outer eye 26 and an enlargement 28 on the main portion 30. As a result, the spring 27 resiliently biases the pivot member 29 toward the center of the frame 21, where the pivot arm 31 engages a holding tab 24 secured, preferably, on the back side of the middle horizontal member 22.2. As is shown in FIG. 12, the force of the spring 27 maintains the pivot arm 31 in engagement with the holding tab 24 and prevents the pivot member 29 from rotating downward and releasing the leg of the animal. A line 32 is connected between the ends of the pivot arms 31 of the pivot members 29 to define a handle that can be grasped and pulled rearward to pivot each of the pivot members rearward. Such movement releases the pivot arms 31 from the hold of the holding tabs 24, and allows the pivot members 29 to be moved laterally inward under the bias of the springs 27 and to pivot downward under the weight of the animal into an animal releasing position. In the animal releasing position, the prongs 25 extend downward and the legs of the animal slip off the prongs, as shown in FIG. 13.

This embodiment uses the same auxiliary support assembly A as the previous embodiment. Therefore, when the pivot members 29 release the animal, the auxiliary support assembly A still supports the animal.

It will be apparent to those skilled in the art and it is contemplated that variations and/or changes in the embodiments illustrated and described herein may be made without departure from the present invention. Accordingly, it is intended that the foregoing description is illustrative only, not limiting.

What is claimed is:

1. A support apparatus for an animal, the support apparatus having a main assembly comprising:
    a main part;
    a pivot arrangement including at least one pivot member connected to said main part for movement between an animal supporting position, in which said at least one pivot member supports the entire weight of the animal, and an animal releasing position, in which the animal separates from the main assembly due to gravity, said at least one pivot member comprising an elongated main portion, and said pivot arrangement further including prongs, each prong extending at an angle from said main portion of said at least one pivot member to engage the animal; and
    means for releasably securing said at least one pivot member in the animal supporting position,
    wherein the elongated main portion of said at least one pivot member has a longitudinal axis, and said pivot member pivots about a pivot axis extending in the same direction as the longitudinal axis.

2. The support apparatus of claim 1, wherein said at least one pivot member pivotally connects to said main part along a pivot axis.

3. The support apparatus of claim 2, further comprising at least one pivot arm extending from said at least one pivot member to move the at least one pivot member from said animal supporting position to the animal release position.

4. The support apparatus of claim 1, wherein the pivot member is a unitary pivot member pivotable with respect to said frame.

5. The support apparatus of claim 1, wherein the main part defines a plane, and the at least one pivot member has a pivot axis parallel to the plane of the main part.

6. A support apparatus for an animal, the support apparatus having a frame assembly comprising:
    a frame;
    at least one pivot member connected to said frame for movement between an animal supporting position, in which said pivot member supports the entire weight of the animal, and an animal releasing position, in which the animal separates from the frame assembly due to gravity, said pivot member comprising an elongated main portion and prongs extending at an angle from said main portion to engage the animal;
    said pivot member comprising means for releasing the animal from said prongs simultaneously with one another; and
    means for releasably securing said pivot member in the animal supporting position,
    wherein the pivot member is a unitary pivot member pivotable with respect to said frame, the unitary pivot member has two opposite, outward ends and a prong is provided at each end.

7. The support apparatus of claim 6, wherein said means for releasably securing further comprises a slideable latch.

8. A support apparatus for an animal, comprising:
    a frame;
    at least one pivot member connected to said frame for movement between an animal supporting position and an animal releasing position, said pivot member comprising a main portion and at least one prong extending at an angle from said main portion to engage the animal;

means for releasably securing said pivot member in the animal supporting position; and an auxiliary support device attached to said frame and to the animal, wherein said auxiliary support device continues to support the animal on said frame after said pivot member is moved to the animal releasing position.

9. The support apparatus of claim 8, wherein said frame is suspended at a frame support point, and said auxiliary support device is attached to said frame at a point directly below the frame support point, thereby minimizing the pitch and yaw of the frame upon release of the animal.

10. The support apparatus of claim 9, wherein said cord is constructed of stainless steel.

11. The support apparatus of claim 9, wherein said cord is constructed of at least one of twine, wire, or braided material.

12. The support apparatus of claim 8, wherein said auxiliary support device comprises a cord.

13. The support apparatus of claim 12 wherein said cord is affixed to a ring and said ring is removably received on a member projecting from said frame.

14. The support apparatus of claim 12, wherein said auxiliary support device further comprises auxilliary securing means for connecting said cord to the animal.

15. The support apparatus of claim 14, wherein said auxiliary securing means comprises spring-clips.

16. The support apparatus of claim 14, wherein said auxiliary securing means comprises "j" hooks.

17. A support apparatus for an animal, comprising:

a frame;

at least one pivot member connected to said frame for movement between an animal supporting position and an animal releasing position, said pivot member comprising a main portion and at least one prong extending at an angle from said main portion to engage the animal, the pivot member being a unitary pivot member pivotable with respect to the frame, the unitary pivot member having two opposite, outward ends and a prong at each end; and means for releasably securing said pivot member in the animal supporting position, wherein said means for releasably securing including a slideable latch, the slideable latch including a collar slidably disposed on said pivot arm;

a latch trigger projecting from the collar; and a safety hook attached to said collar and releasably engaging said frame.

18. The support apparatus of claim 17, wherein said safety hook engages said frame at a point spaced from the pivot axis of the pivot member.

19. A support apparatus for an animal, comprising:

a frame defining a plane and including an elongate member having a longitudinal axis;

at least one pivot member having a pivot axis parallel to the plane of said frame and extending in the same direction as the longitudinal axis of the elongate member, the at least one pivot member being connected to said frame for movement between an animal supporting position, in which said pivot member supports the entire weight of the animal, and an animal releasing position, in which the animal separates from the frame assembly due to gravity, said pivot member comprising a main portion and prongs extending at an angle from said main portion to engage the animal; and means for releasably securing said pivot member in the animal supporting position.

20. A gambrel support having a frame assembly comprising:

means for releasably holding an animal with at least one animal support element in an animal supporting positions, in which said releasable holding means supports the entire weight of the animal;

means for simultaneously releasing the legs of the supported animal from the support element such that the animal remains centered, with respect to the gambrel, on release whereby the pitch and yaw of the gambrel are minimized, and the animal is separated from the pivot member; and an auxiliary support member connected to said frame assembly for supporting the animal after separation from the pivot member.

* * * * *